United States Patent [19]
Dowe

[11] Patent Number: 5,956,527
[45] Date of Patent: Sep. 21, 1999

[54] WATERPROOF PROTECTIVE HOUSING FOR CAMERA

[75] Inventor: David R. Dowe, Holley, N.Y.

[73] Assignee: Eastman Kodak Company, Rochester, N.Y.

[21] Appl. No.: 09/073,450

[22] Filed: May 5, 1998

[51] Int. Cl.⁶ ................................................. G03B 17/08
[52] U.S. Cl. ........................................ 396/25; 206/316.2
[58] Field of Search ................................ 396/25, 26, 27, 396/28, 29; 348/81; 206/316.2, 811

[56] References Cited

U.S. PATENT DOCUMENTS 4,033,392  7/1977  Less ........................ 206/316.2
4,666,274  5/1987  Maeno et al. .

*Primary Examiner*—Howard B. Blankenship
*Attorney, Agent, or Firm*—Roger A. Fields

[57] ABSTRACT

A waterproof protective housing for a camera comprising an elastic pouch which is shaped and dimensioned to enclose the camera and has an opening for a taking lens of the camera, is characterized in that a pair of rigid outer and inner clamping parts are secured together parallel to one another to squeeze the elastic pouch between them at the opening to provide a watertight seal around the opening, and at least one of the outer and inner clamping parts is transparent and covers the opening.

2 Claims, 3 Drawing Sheets

WATERPROOF PROTECTIVE HOUSING FOR CAMERA

FIELD OF THE INVENTION

The invention relates generally to the field of photography, and in particular to a waterproof protective housing for a camera.

BACKGROUND OF THE INVENTION

It is known for a waterproof protective housing to be in the form of an elastic pouch which is shaped and dimensioned to enclose a camera. The pouch is transparent or it includes a fixed window within an opening for a taking lens of the camera. When the pouch includes a window, a watertight seal must be provided between the window and the opening.

SUMMARY OF THE INVENTION

Generally speaking, a waterproof protective housing for a camera comprising an elastic pouch which is shaped and dimensioned to enclose the camera and has an opening for a taking lens of the camera, is characterized in that:

a pair of rigid outer and inner clamping parts are secured together parallel to one another to squeeze the elastic pouch between them at the opening to provide a watertight seal around the opening, and at least one of the outer and inner clamping parts is transparent and covers the opening.

In a preferred embodiment, a waterproof protective housing for a camera comprising an elastic pouch which is shaped and dimensioned to enclose the camera and has an opening for a taking lens of the camera, is characterized in that:

a pair of transparent rigid outer and inner lens covers are secured together parallel to one another to squeeze the elastic pouch between them at the opening to provide a watertight seal around the opening.

In an alternative embodiment, a waterproof protective housing for a camera comprising an elastic pouch which is shaped and dimensioned to enclose the camera and has an opening for a taking lens of the camera, is characterized in that:

a transparent rigid outer lens cover and a rigid inner frame are secured together parallel to one another to squeeze the elastic pouch between them at the opening to provide a watertight seal around the opening.

DETAILED DESCRIPTION OF THE INVENTION

The invention is disclosed as being embodied preferably in a waterproof protective housing for a camera. Because the features of a waterproof protective housing for a camera are generally known, the description which follows is directed in particular only to those elements forming part of or cooperating directly with the disclosed embodiment. It is to be understood, however, that other elements may take various forms known to a person of ordinary skill in the art.

Figure 1:
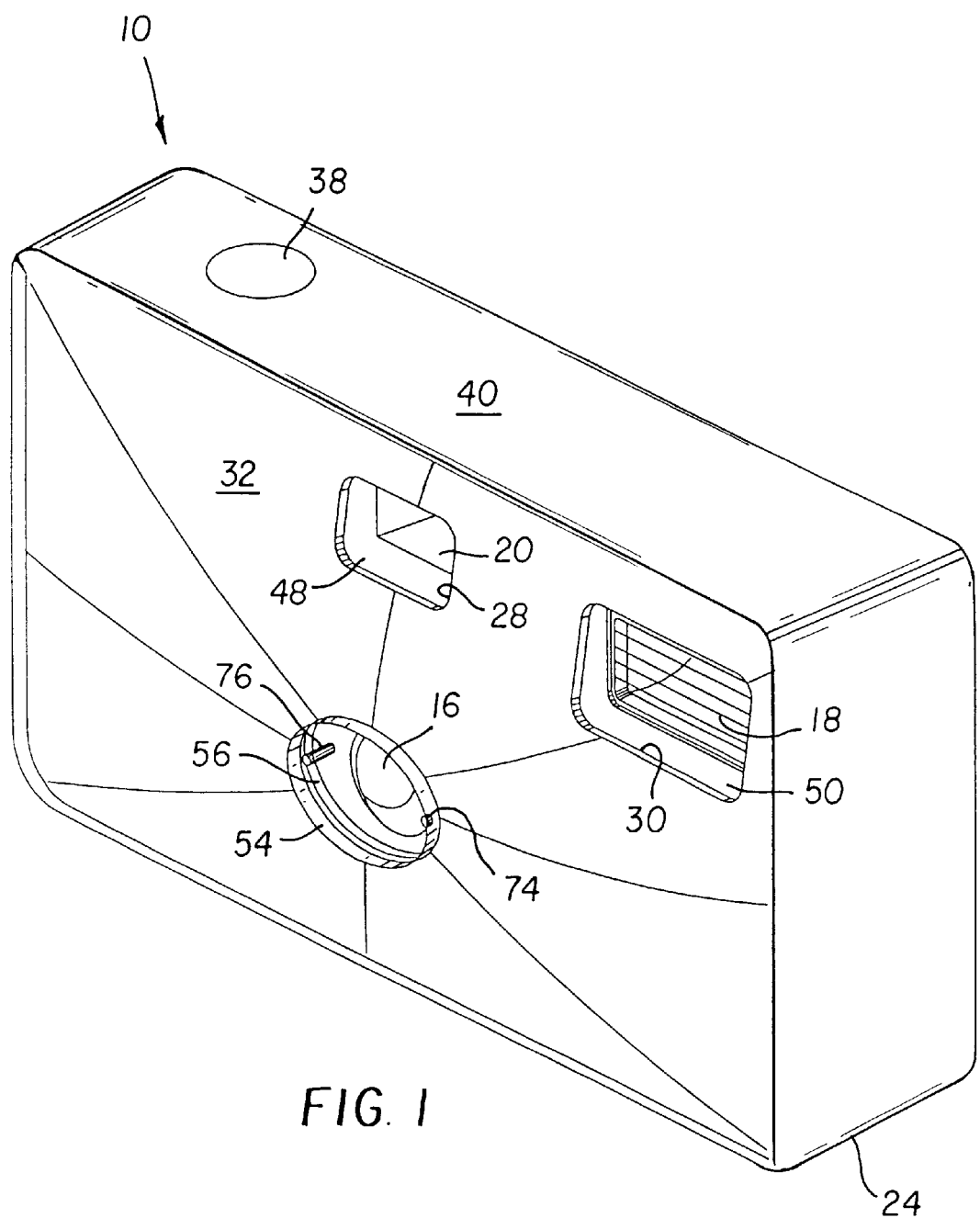
FIG. 1 is a front perspective view of a waterproof protective housing according to a preferred embodiment of the invention, showing the housing enclosing a camera.
Figure 2:
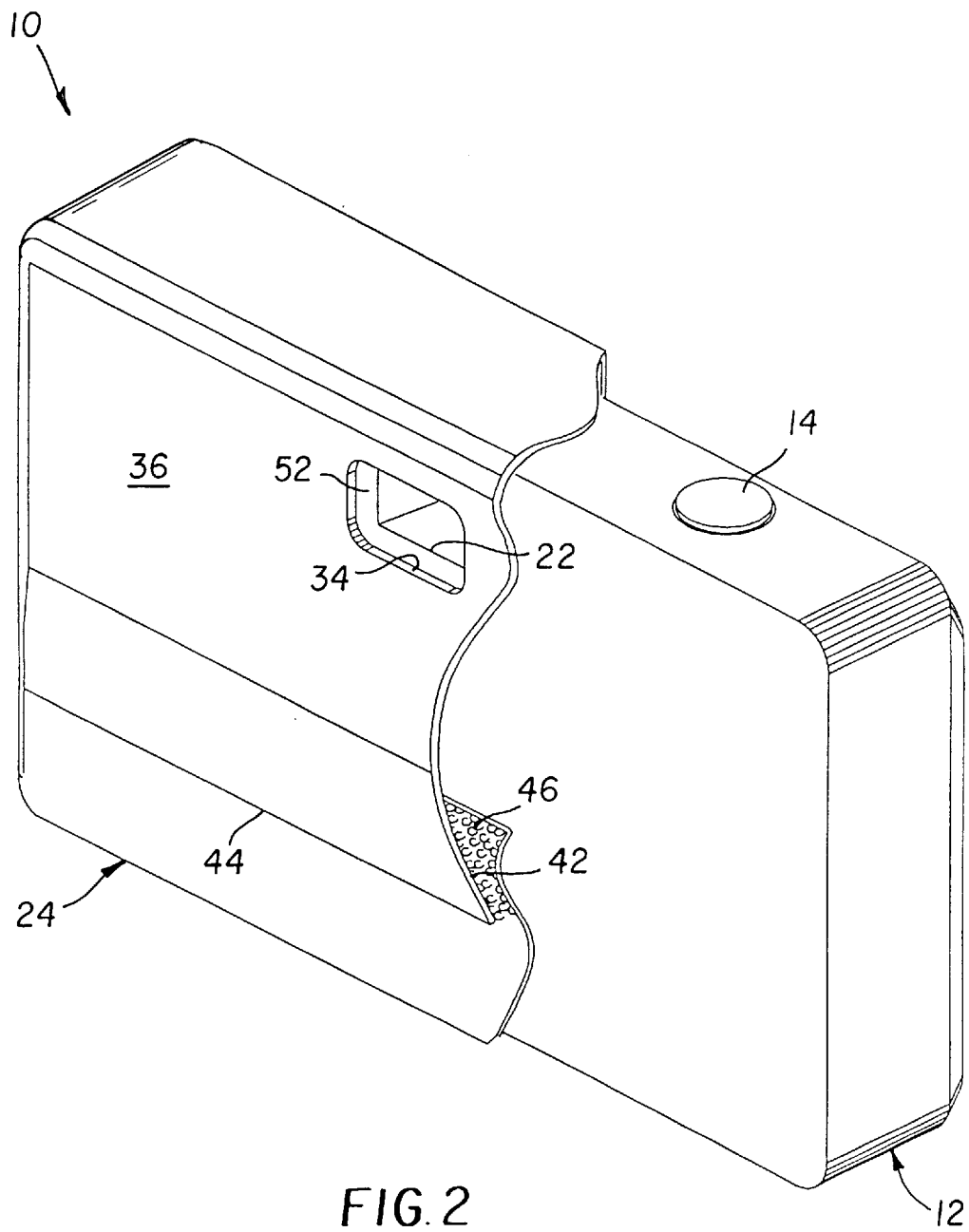
FIG. 2 is a rear perspective view of the waterproof protective housing and the camera.
Figure 3:
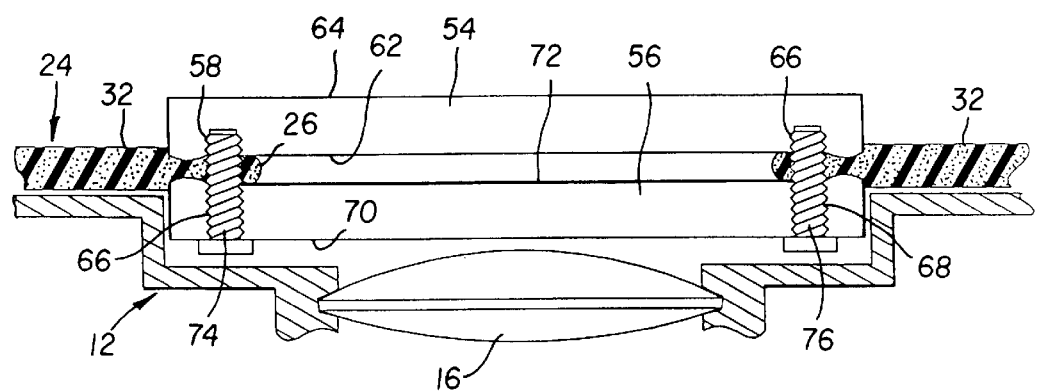
FIG. 3 is a sectional view of a preferred version of a front housing portion which is located over a taking lens of the camera.

Preferred Embodiment FIGS. 1–3

Referring now to the drawings, FIGS. 1–3 show a preferred version of a waterproof protective housing 10 for a camera 12.

The camera 12 is a known type that includes a manually depressible shutter release button 14, a taking lens 16, a flash emission lens 18, and a pair of optically aligned front and rear viewfinder lenses 20 and 22. See FIGS. 1 and 2.

A rectangular shaped pouch or bag 24 of the protective housing 10 is constructed of known neoprene rubber to be elastic, waterproof and shock absorbing. The pouch 24 has respective openings 26, 28 and 30 in a front wall 32 of the pouch for the taking lens 16, the front viewfinder lens 20 and the flash emission lens 18 and a single opening 34 in a rear wall 36 of the pouch for the rear viewfinder lens 22. A circle 38 is printed on a top wall 40 of the pouch 24 over the shutter release button 14 to provide a visible indication of the spot on the pouch to be manually depressed to in turn similarly depress the shutter release button.

As shown in FIG. 2, the rear wall 36 of the pouch 24 has an ingress/egress slit 42 through which the camera 12 is inserted into the pouch and can be removed from the pouch. A pair of overlapping outer and inner longitudinal edge portions 44 and 46 of the rear wall 36 include a known adhesion substance for releasably holding the edge portions together to close the slit 42 and make it watertight.

The openings 28 and 30 in the front wall 32 of the pouch 24 for the flash emission lens 18 and the front viewfinder lens 20 and the opening 34 in the rear wall 36 of the pouch for the rear viewfinder lens 22 have respective fixed windows 48, 50 and 52 which are constructed of known vinyl plastic to be flexible.

As shown in FIG. 3, a pair of transparent outer and inner lens covers 54 and 56 are constructed of known acrylic plastic to be rigid. The outer lens cover 54 has two identical threaded holes 58 and 60 that project from a rear face 62 of the outer lens cover only partway towards a front face 64 of the outer lens cover. The inner lens cover 56 has similar threaded holes 66 and 68 that project from a rear face 70 of the inner lens cover to a front face 72 of the inner lens cover. Respective screw fasteners 74 and 76 extend through the threaded holes 58, 66 and 60, 68 to secure the outer and inner lens covers 54 and 56 together parallel to one another to squeeze the pouch 24 between them at the opening 26 in the front wall 32 of the pouch for the taking lens 16, in order to provide a watertight seal around the opening. Squeezing the pouch 24 as illustrated in FIG. 3 provides an excellent seal.

Figure 4:
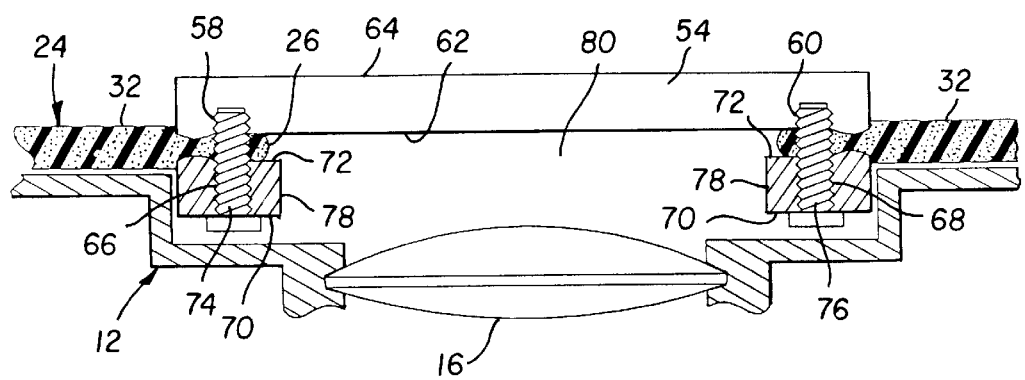
FIG. 4 is a sectional view of an alternative version of the front housing portion shown in FIG. 3.

Alternative Embodiment FIGS. 1, 2 and 4

The only difference between FIGS. 3 and 4 is that in FIG. 4, in place of the inner lens cover 56, there is provided an opaque frame or ring 78 having a center opening 80 optically aligned with the taking lens 16.

The invention has been described with reference to a preferred embodiment. However, it will be appreciated that variations and modifications can be effected by a person of ordinary skill in the art without departing from the scope of the invention.

PARTS LIST 10. waterproof protective housing
12. camera
14. shutter release button
16. taking lens
18. flash emission lens
20. front viewfinder lens
22. rear viewfinder lens
24. pouch
26. opening
28. opening
30. opening
32. front wall
34. opening
36. rear wall
38. circle
40. top wall
42. ingress/egress slit
44. longitudinal edge portion
46. longitudinal edge portion
48. fixed window
50. fixed window
52. fixed window
54. outer lens cover
56. inner lens cover
58. threaded hole
60. threaded hole
62. rear face
64. front face
66. threaded hole
68. threaded hole
70. rear face
72. front face
74. screw fastener
76. screw fastener
78. frame
80. center opening

What is claimed is:

1. A waterproof protective housing for a camera comprising an elastic pouch which is shaped and dimensioned to enclose the camera and has an opening for a taking lens of the camera, is characterized in that:

a pair of outer and inner lens covers are secured together to squeeze said elastic pouch between them at said opening to provide a watertight seal around the opening, and one of said outer and inner lens covers has several holes that project from a rear face of the one lens cover only partway towards a front face of the one lens cover, and fasteners extend from the other lens cover into said holes in said one lens cover to secure the outer and inner lens covers together.

2. A waterproof protective housing for a camera comprising an elastic pouch which is shaped and dimensioned to enclose the camera and has an opening for a taking lens of the camera, is characterized in that:

a pair of transparent rigid outer and inner lens covers are secured together parallel to one another to squeeze said elastic pouch between them at said opening to provide a watertight seal around the opening, said outer lens cover has several holes that project from a rear face of the outer lens cover only partway towards a front face of the outer lens cover, said inner lens cover has similar holes that project from a rear face of the inner lens cover to a front face of the inner lens cover, and fasteners extend through said holes in said inner lens cover and into said holes in said outer lens cover to secure the outer and inner lens covers together.

* * * * *